July 19, 1927.
H. M. PERRY
HAND TRUCK ATTACHMENT
Filed Sept. 20, 1926
1,636,574
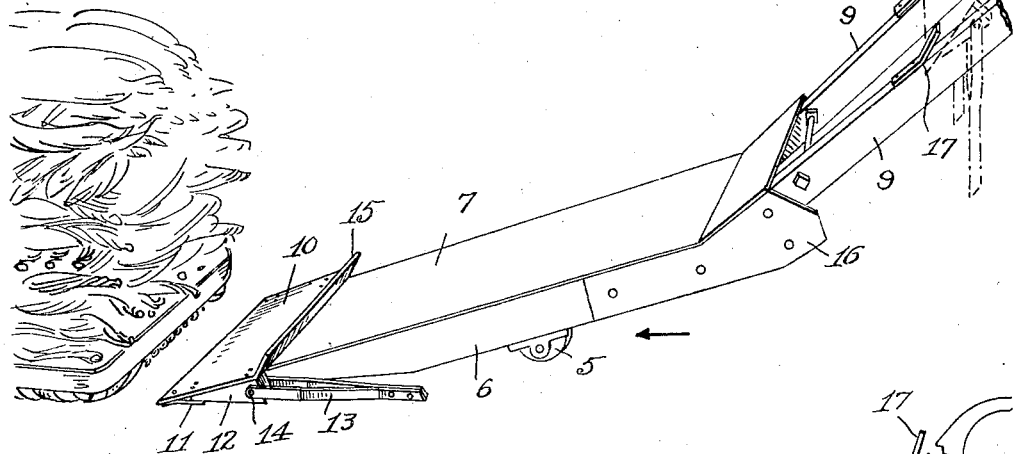
Fig. 1.
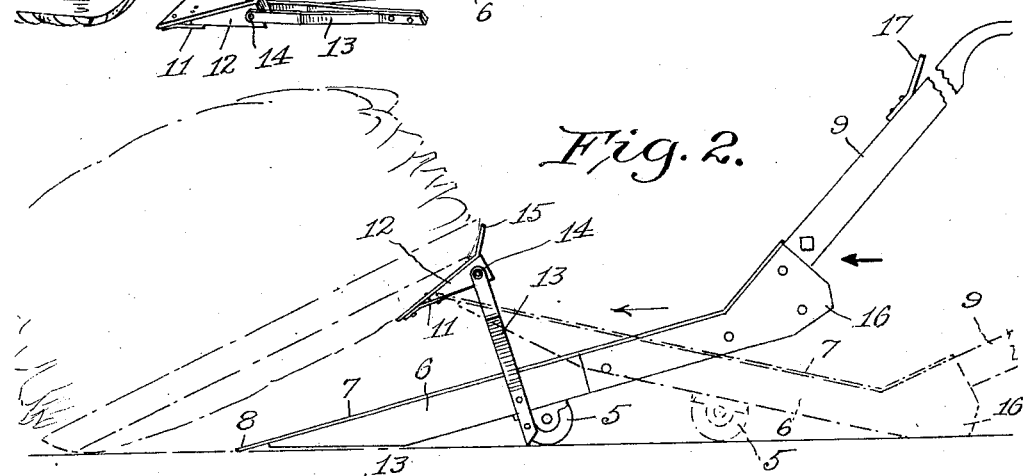
Fig. 2.
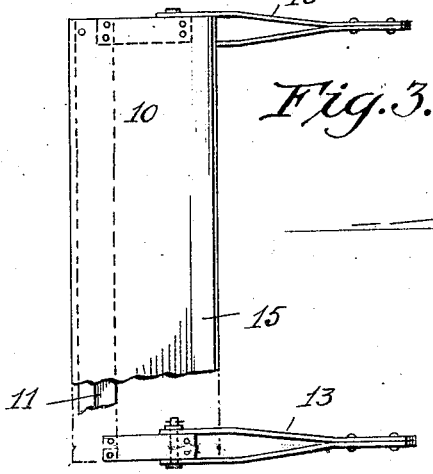
Fig. 3.
Fig. 4.
Inventor,
H. M. Perry.
By Davis & Davis
Attorneys Patented July 19, 1927.

1,636,574

UNITED STATES PATENT OFFICE.

HOWARD M. PERRY, OF CLARKSVILLE, TENNESSEE.

HAND-TRUCK ATTACHMENT.

Application filed September 20, 1926. Serial No. 136,531.

This invention relates to that type of hand truck especially adapted for warehouse use, and the present construction is particularly adapted for handling tobacco in loose bales, it being the usual custom to pile the tobacco in the form of a loose bale within a basket-like tray. It is the present custom to load these bales upon a truck by means of hooks, at least two men being required to load a bale upon a truck. With my invention, it will require the services of but one man to perform the loading operation, and, besides, the injury to the basket and the tobacco by the use of hooks will be entirely avoided, as more fully hereinafter set forth.

In the drawing,

Fig. 1 is a perspective view of my invention in position to be shoved under a bale;

Fig. 2 is a side elevation showing the prop positioned under the bale;

Fig. 3 is a plan view of the prop disconnected from the truck, the parts being broken away for the purpose of illustration;

Fig. 4 is a detail vertical sectional view showing the position of the parts when first shoved under the bale.

In carrying out my invention, I use a truck mounted on a pair of wheels 5 located about midway of the body of the truck, the side bars 6 of the truck being tapered off forwardly at their forward ends. The supporting surface 7 of the truck consists of a sheet-metal plate 7 whose extreme forward edge 8 extends a little beyond the tapered forward ends of the side bars. Attached to the rear ends of the side bars 6 is a pair of handles 9 which extend upwardly and rearwardly from the body of the truck. When the handles are tilted upwardly, the wheel serving as a fulcrum, the forward projecting edge 8 of the floor-plate of the truck will be brought down against the floor in position to be pushed, wedge-like, under the bale. When the handles are tilted downwardly, the floor-plate 7 will be brought up to a horizontal position, in transportation position.

For use with this truck, I provide a bale-prop which is adapted to be so manipulated by the truck that it may be employed for propping up the bale, as shown in dotted lines in Fig. 2, in position to admit of the truck being readily shoved under the bale to thereby deposit it upon the plate 7. This prop consists of a transverse plate 10 adapted to extend across and rest upon the forward part of the truck-plate 7, a narrow sheet-metal plate 11 being riveted to the forward under surface of the plate 10 to form a V-shaped socket for the reception of the forward edge 8 of the plate 7. Attached to the under side of the plate 10 is a pair of wedge-shaped blocks 12, these blocks having approximately the tapered shape of the forward ends of the side bars 6. One of these wedge-blocks 12 is attached to each side edge of the plate 10, in position to lie alongside of the adjacent bar 6. The forward tapered end of each of the blocks 12 projects into the V-shaped socket formed by the flange 11. A leg 13 is attached to the rear end of each one of the wedge-blocks 12, the attachment to the blocks being by means of a pivot 14, so that the legs are free to swing fore-and-aft with respect to the truck.

When it is desired to load a bale onto the truck, the prop is attached to the truck as shown in Figs. 1 and 4, that is, the forward edge 8 is pushed under the plate 10 and into the socket formed by the flange 11, with the wedge-blocks 12 lying outside of the truck-bars 6 and the freely-swinging legs 13 extending rearwardly and resting on the floor. With the prop device attached to the truck in this manner, it will be readily seen that the operator may, by applying force to the handles, shove it under the bale. After the plate 10 is shoved its full width under the bale (as shown in Fig. 4), the rear ends of the handles are forced downwardly with the result that the forward end of the truck is tilted upwardly, as shown in dotted lines in Fig. 2. As the near edge of the bale rises from the floor, the legs 13 automatically swing forwardly, with their lower ends resting on the warehouse floor. When the proper height is reached, the legs are in position to support the bale in its tilted position, as shown in full lines in Fig. 2, whereupon the truck is free to be withdrawn from under the prop. To insure against slipping, the lower ends of the legs are slightly sharpened to thus insure a biting engagement with the floor-boards. After the bale has thus been raised and propped up, the truck may, as will be readily seen, be shoved under the bale to thus deposit it upon the plate 7, whereupon the handles may be tilted down to bring the truck-body up into horizontal position, ready for transportation.

To insure the prop-plate 10 being properly positioned with respect to the basket of the bale when it is shoved under the same, I provide the rear edge of the plate 10 with a stop-flange 15 extending upwardly and rearwardly. To insure that the truck shall be tilted to the proper degree, as shown in dotted lines in Fig. 2, I provide the rear ends of the side bars 6 each with a floor-stop 16 adapted to strike against the warehouse-floor and thus arrest the tilting action at the point where the proper operation of the legs 13 will be assured. After the bale is loaded upon the truck in the manner set forth, the prop device will be free to be removed from the truck. For convenience in carrying this prop device about with the truck, I hang it upon the handles 9, as shown in dotted lines in Fig. 1, a pair of keepers 17 being provided on the handles for this purpose.

What I claim as new is:

1. In combination with a tiltable truck, a prop embodying a supporting-plate, means for detachably engaging the plate with the forward end of the truck-body, and legs connected to said plate adapted to automatically assume propping position when the truck is tilted to tilt the load.

2. In combination with a tiltable truck, a prop embodying a supporting-plate, means for detachably engaging the plate with the forward end of the truck-body, and legs connected to said plate adapted to automatically assume propping position when the truck is tilted to tilt the load, said means for detachably engaging the supporting-plate with the truck-body consisting of a socket-like arrangement underneath the plate.

3. In combination with a tiltable truck, a prop embodying a supporting-plate and means for detachably engaging it with the forward end of the truck-body, and legs adapted to automatically assume propping position when the truck is tilted to tilt the load, said legs being pivotally connected at their upper ends to said supporting-plate so as to swing forwardly into propping position when the supporting-plate is raised through the medium of the truck.

4. The combination with a tiltable truck having its floor-plate extended beyond the truck-body and the forward ends of its side-bars tapered, for the purpose set forth, of a prop device adapted to be detachably engaged with said forwardly-projecting floor-plate and embodying a bale-supporting-member and also prop-legs connected to said bale-supporting-member adapted to come into propping position when the truck is tilted to elevate said supporting-plate.

5. The combination with a truck adapted to be tilted fore-and-aft and having a forward edge tapered to enable it to be pushed under a bale, and a bale-propping device detachably engaging the said tapered forward end of the truck.

6. The combination with a truck adapted to be tilted fore-and-aft and having a forward edge tapered to enable it to be pushed under a bale, and a bale-propping device detachably engaging the said tapered forward end of the truck, said propping device embodying a supporting-plate having a socket on its under side facing rearwardly, a pair of blocks attached to the under side of the supporting-plate, and a freely-swinging leg pivotally attached to each of these blocks.

7. A bale-prop consisting of a supporting-plate having an upwardly and rearwardly extending flange at its rear edge and a socket on its under side near its forward edge, and a pair of freely-swinging legs attached to the supporting-plate at its opposite side edges, combined with a tiltable truck whose forward end is adapted to detachably engage in said socket.

8. The combination with a tiltable wheeled hand-truck having its forward edge tapered to a thin transverse edge adapted to be pushed under a bale and having at the rear end of its frame or body a stop adapted to strike against the floor to restrict the tilting action of the truck, and a bale-prop adapted for detachable engagement with the said tapered forward end of the truck and embodying legs adapted to come into propping position when the truck is tilted upwardly at its forward end.

In testimony whereof I hereunto affix my signature.

HOWARD M. PERRY.